United States Patent
Yoshitomi et al.

(10) Patent No.: US 11,127,959 B2
(45) Date of Patent: Sep. 21, 2021

(54) VALVE

(71) Applicant: HONDA MOTOR CO., LTD., Tokyo (JP)

(72) Inventors: Ryoichi Yoshitomi, Wako (JP); Tetsuya Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 32 days.

(21) Appl. No.: 16/867,111

(22) Filed: May 5, 2020

(65) Prior Publication Data

US 2020/0358115 A1    Nov. 12, 2020

(30) Foreign Application Priority Data

May 10, 2019    (JP) .............................. JP2019-089766

(51) Int. Cl.

| | |
|---|---|
| *H01M 8/04* | (2016.01) |
| *H01M 8/04119* | (2016.01) |
| *H01M 8/04223* | (2016.01) |
| *H01M 8/22* | (2006.01) |
| *B60L 50/72* | (2019.01) |

(52) U.S. Cl.
CPC ... *H01M 8/04179* (2013.01); *H01M 8/04253* (2013.01); *H01M 8/22* (2013.01); *B60L 50/72* (2019.02)

(58) Field of Classification Search
CPC .......... H01M 8/04179; H01M 8/04253; B60L 50/72
USPC .......................................................... 429/450
See application file for complete search history.

(56) References Cited

U.S. PATENT DOCUMENTS

2003/0022041 A1*   1/2003   Barton .............. H01M 8/04231
                                                                429/432
2010/0071781 A1    3/2010   Hatta

FOREIGN PATENT DOCUMENTS

JP      2008-270151 A     11/2008
KR      20150113398 A  *  10/2015

* cited by examiner

*Primary Examiner* — James M Erwin
(74) *Attorney, Agent, or Firm* — Carrier Blackman & Associates, P.C.; Joseph P. Carrier; William D. Blackman

(57) ABSTRACT

A valve is disposed in a reactant gas system apparatus of a fuel cell system. The valve includes a housing having an internal channel as a passage of water, and heaters in the form of rods inserted into the housing. An orifice having a small channel cross sectional area is provided at a predetermined position of the channel. The heaters are inclined from a solenoid of the valve in an axial direction of the housing, and front ends of the heaters are positioned close to the orifice.

7 Claims, 4 Drawing Sheets

VALVE

CROSS-REFERENCE TO RELATED APPLICATION

This application is based upon and claims the benefit of priority from Japanese Patent Application No. 2019-089766 filed on May 10, 2019, the contents of which are incorporated herein by reference.

BACKGROUND OF THE INVENTION

Field of the Invention

The present invention relates to a valve installed in a reactant gas system apparatus of a fuel cell system.

Description of the Related Art

In the fuel cell system, power generation cells in a fuel cell stack perform power generation by supplying an anode gas and a cathode gas from reactant gas system apparatuses (an anode gas system apparatus and a cathode gas system apparatus) to the fuel cell stack.

The anode gas system apparatus includes a valve (purge valve) for discharging water contained in the anode off gas discharged from the fuel cell stack (see Japanese Laid-Open Patent Publication No. 2008-270151). In the valve of this type, when water is frozen under low temperature environment of the fuel cell system, the internal channel may be closed (clogged). In an attempt address the problem, in a valve disclosed in Japanese Laid-Open Patent Publication No. 2008-270151 is provided with a heater for defrosting the water.

SUMMARY OF THE INVENTION

In this regard, in the valve, under the low temperature environment, an orifice of a channel having the small channel cross sectional area tends to be closed (clogged) most easily. Therefore, preferably, a heater heats an area around the orifice. However, if the heater is simply installed adjacent to the orifice, for example, a housing provided around the orifice becomes thick, and the housing and the heater interfere with other structure of the fuel cell system where the installation space is limited, or the channel shape in the valve is significantly limited disadvantageously.

The present invention relates to a valve applied to the above fuel cell system, and an object of the present invention is to provide a valve which makes it possible to achieve size reduction, and suitably suppress freezing of an orifice or defrosting of the orifice regardless of the channel shape.

In order to achieve the above object, according to an aspect of the present invention, a valve is provided. The valve is disposed in a reactant gas system apparatus of a fuel cell system, the valve including a housing having an internal channel where liquid is configured to flow, and a heater in form of a rod inserted into the housing, wherein an orifice having a small channel cross sectional area is provided at a predetermined position of the channel, and the heater is inclined from a solenoid of the valve in an axial direction of the housing, and a front end of the heater is positioned close to the orifice.

In the valve, the front end of the heater is positioned close to the orifice. In the structure, under the low temperature environment, it is possible to rapidly heat the area around the orifice, and suitably suppress freezing of the orifice or defrost of the orifice. Further, since the heater is inclined from the solenoid in the axial direction of the housing, it is possible to install the heater without thickening the housing, at a position away from the channel. Therefore, it is possible to achieve reduction in the size of the valve, and easily dispose the valve in the fuel cell system where the installation space is small, and moreover, it is possible to heat the area around the orifice regardless of the channel shape.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, preferred embodiments of the present invention will be described in detail with reference to the accompanying drawings.

Figure 1:
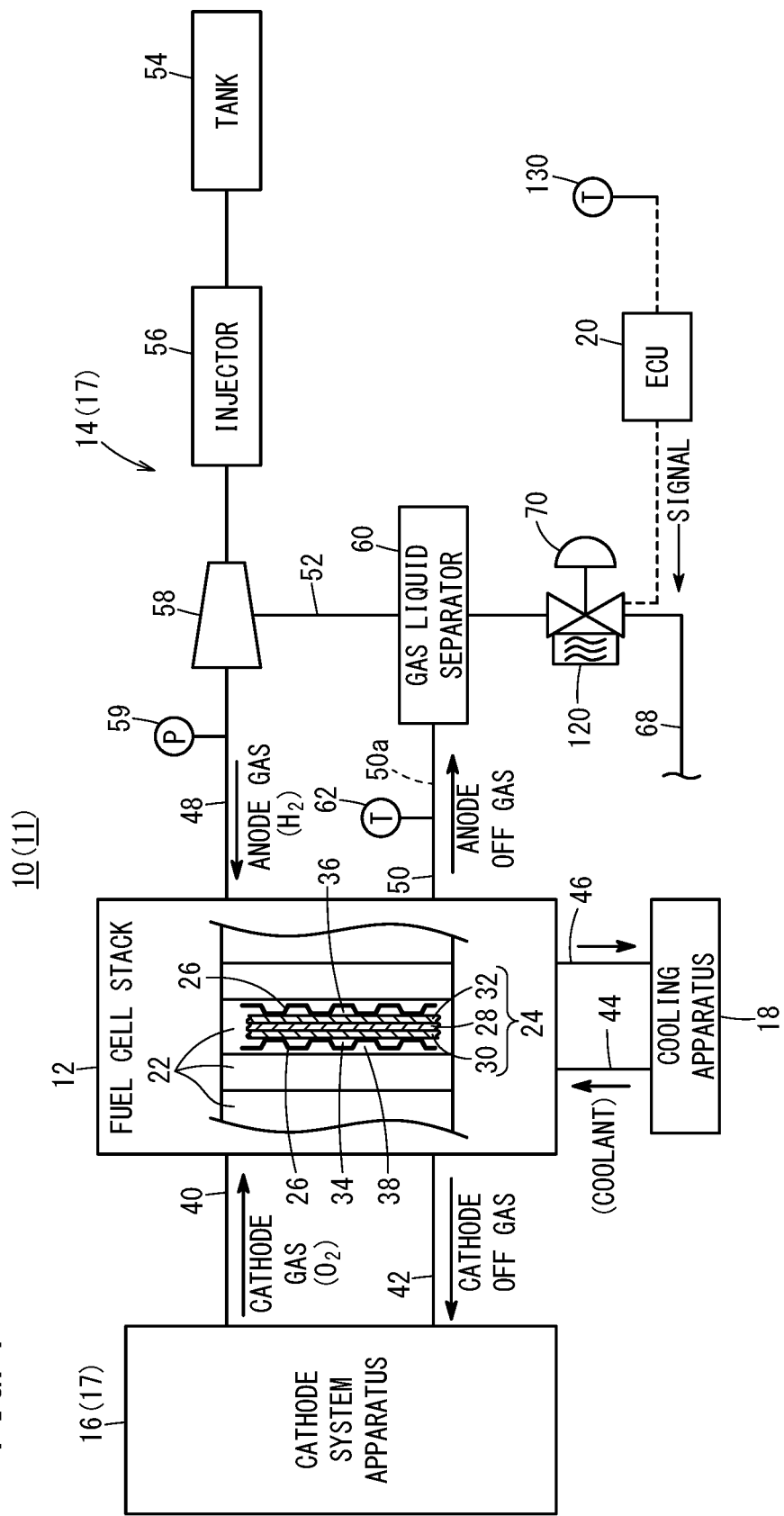
FIG. 1 is a block diagram schematically showing overall structure of a fuel cell system according to an embodiment of the present invention.

As shown in FIG. 1, a valve 70 according to an embodiment of the present invention is applicable to reactant gas system apparatuses 17 of a fuel cell system 10 mounted in a fuel cell vehicle 11 (fuel cell automobile: hereinafter simply referred to as the vehicle 11), and performs switching between discharge of reactant gases containing water produced in the reactant gas system apparatuses 17 and stop of the discharge of the reactant gases. The fuel cell system 10 includes a fuel cell stack 12, an anode system apparatus 14, a cathode system apparatus 16, a cooling apparatus 18, and a control device 20 (ECU).

The fuel cell stack 12 includes a plurality of power generation cells 22 which perform power generation by electrochemical reactions of an anode gas (fuel gas such as hydrogen) supplied from the anode system apparatus 14 and a cathode gas (oxygen-containing gas such as the air) supplied from the cathode system apparatus 16. That is, the anode system apparatus 14 is one of the reactant gas system apparatuses 17 for allowing the anode gas to flow into the fuel cell stack 12, and the cathode system apparatus 16 is the other of the reactant gas system apparatuses 17 for allowing the cathode gas to flow into the fuel cell stack 12.

The plurality of power generation cells 22 are stacked together in the vehicle width direction of the vehicle 11 in a manner that electrode surfaces of the power generation cells 22 are oriented upright. The plurality of power generation cells 22 may be stacked together in a front/rear direction of the vehicle 11 or in the gravity direction.

Each of the power generation cells 22 includes a membrane electrode assembly 24 (hereinafter referred to as the "MEA 24"), and two separators 26 sandwiching the MEA 24. The MEA 24 includes an electrolyte membrane 28 (e.g., a solid polymer electrolyte membrane (cation ion exchange membrane)), an anode 30 provided on one surface of the electrolyte membrane 28, and a cathode 32 provided on the other surface of the electrolyte membrane 28. One of the two separators 26 has an anode flow field 34 on its surface facing the anode 30 as a passage of the anode gas. The other of the two separators 26 has a cathode flow field 36 on its surface facing the cathode 32 as a passage of the cathode gas. Further, a coolant flow field 38 as a passage of a coolant is formed between surfaces of the two separators 26 that face each other.

Further, a plurality of fluid passages (not shown) extend through the fuel cell stack 12 for allowing the anode gas, the cathode gas, and the coolant flow to flow through the power generation cells 22 in the stacking direction, and flow through the anode flow field 34, the cathode flow field 36, and the coolant flow field 38. The fluid passages are connected to pipes of the anode system apparatus 14, the cathode system apparatus 16, and the cooling apparatus 18 connected to the fuel cell stack 12, respectively.

The cathode system apparatus 16 includes a cathode supply pipe 40 for supplying the cathode gas to the fuel cell stack 12, and a cathode discharge pipe 42 for discharging the cathode off gas partially consumed in power generation of the fuel cell stack 12. Further, pipes of the cooling apparatus 18 include a coolant supply pipe 44 for supplying the coolant to the fuel cell stack 12, and a coolant discharge pipe 46 for discharging the coolant from the fuel cell stack 12.

The anode system apparatus 14 includes an anode supply pipe 48 for supplying the anode gas to the fuel cell stack 12, and an anode discharge pipe 50 for discharging the anode off gas partially consumed in power generation of the fuel cell stack 12. Further, a bypass pipe 52 is connected between the anode supply pipe 48 and the anode discharge pipe 50 for returning the hydrogen (anode gas) contained in the anode off gas of the anode discharge pipe 50, to the anode supply pipe 48.

The anode system apparatus 14 includes a tank 54, an injector 56, an ejector 58, and a pressure sensor 59, arranged in this order from the upstream side to the downstream side of the anode supply pipe 48, as devices for supplying the anode gas to the fuel cell stack 12. The tank 54 is connected to one end of the anode supply pipe 48, and supplies the anode gas (high pressure hydrogen gas) stored in the tank 54 to the anode supply pipe 48. The injector 56 injects the anode gas supplied from the upstream side of the anode supply pipe 48 toward the downstream side of the anode supply pipe 48, at a predetermined flow rate at a predetermined injection pressure. The ejector 58 sucks the anode gas from the bypass pipe 52, and supplies the anode gas to the fuel cell stack 12 on the downstream side, by the negative pressure generated by the flow of the anode gas injected from the injector 56. The pressure sensor 59 detects the pressure of the anode gas supplied to the fuel cell stack 12.

On the other hand, a gas liquid separator 60 and a temperature sensor 62 for detecting the temperature of the anode off gas are provided for the anode discharge pipe 50 of the anode system apparatus 14. The anode off gas discharged from the fuel cell stack 12 contains water produced in power generation of the fuel cell stack 12, unreacted hydrogen (anode gas) which has not been consumed in power generation, and nitrogen which passed through the electrolyte membrane 28 from the cathode. The gas liquid separator 60 separates the gas and the liquid water contained in the anode off gas.

Figure 2:
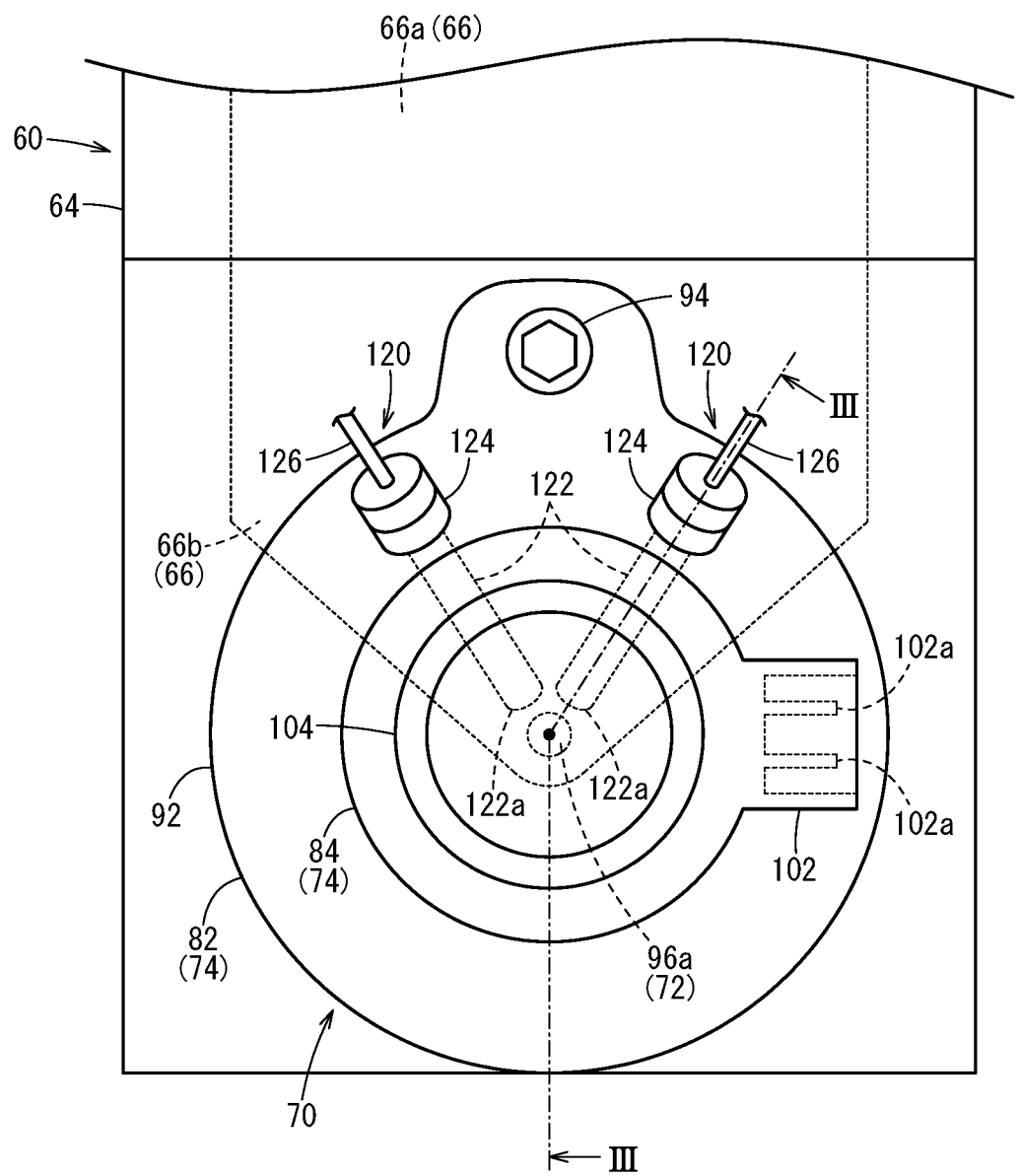
FIG. 2 is a view schematically showing a valve in FIG. 1, as viewed from a proximal end side.

As shown in FIG. 2, the gas liquid separator 60 includes a case 64 (structural body) having a predetermined shape connected to the anode discharge pipe 50. An internal space 66 is provided in the case 64. The internal space 66 is connected to a flow channel 50a (see FIG. 1) in the anode discharge pipe 50. The internal space 66 includes a gas chamber 66a provided on the upper side in the gravity direction and a water storage chamber 66b provided on the lower side in the gravity direction. One end of the bypass pipe 52 is connected to the gas chamber 66a of the gas liquid separator 60.

Further, the valve 70 (purge valve, bleed valve) is provided for the gas liquid separator 60, for discharging the water and the reactant gas separated from the anode off gas into a water discharge pipe 68. In the embodiment of the present invention, the valve 70 is in the form of a unit fixed to the lower position in the gravity direction of the case 64 of the gas liquid separator 60. The valve 70 has an internal channel 72 connected to the water storage chamber 66b. It is not essential that the valve 70 is attached to the gas liquid separator 60 integrally. For example, the valve 70 may be provided for the water discharge pipe 68 (see FIG. 1) connected to the gas liquid separator 60. Further, the valve 70 of the present invention is applicable to other valves used in the channels of the reactant gas system apparatuses 17 of the fuel cell system 10.

Figure 3:
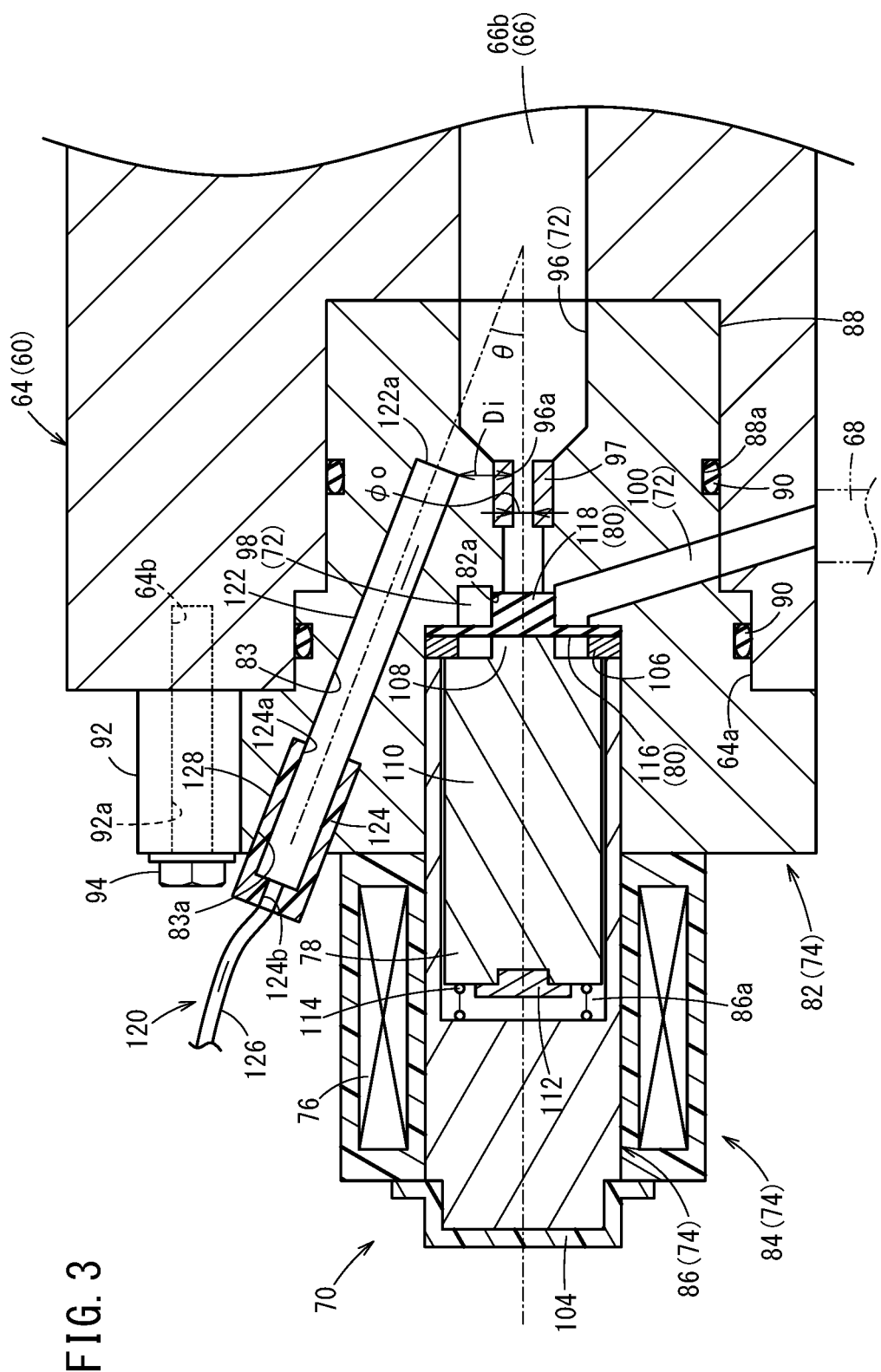
FIG. 3 is a cross sectional view taken along a line III-III in FIG. 2.

As shown in FIGS. 2 and 3, the valve 70 includes a housing 74, a solenoid 76, a plunger 78, and a valve body 80. Further, the housing 74 is divided into a fixing housing 82 for fixing the valve 70 to the gas liquid separator 60, a solenoid housing 84 for accommodating the solenoid 76, and a plunger housing 86 for accommodating the plunger 78. It should be noted that the structure of the housing 74 is not limited to the above described embodiment. For example, the three housings 82, 84, 86 may be formed integrally. Conversely, the housing 74 may have structure which is dividable into four pieces.

The fixing housing 82 is in the form of a cylindrical body 88 having the channel 72 as a passage of liquid water (and part of the gas) of the gas liquid separator 60. The cylindrical body 88 is inserted into an attachment hole 64a formed on the lower side of the case 64 of the gas liquid separator 60 in the gravity direction. A plurality of (two, in the illustrated embodiment) grooves 88a are formed around the outer peripheral surface of the cylindrical body 88 in the circumferential direction. In the state where the cylindrical body 88 is inserted into the attachment hole 64a of the gas liquid separator 60, an O-ring 90 is attached to each of the grooves 88a. The O-ring 90 seals a position between an inner wall of the attachment hole 64a and the cylindrical body 88.

Further, a flange 92 is provided continuous with the cylindrical body 88 exposed from the attachment hole 64a, for attaching the valve 70 to the case 64. The flange 92 protrudes in a direction perpendicular to the axial direction of the cylindrical body 88, and is formed in an annular shape around the cylindrical body 88. The upper side of the flange 92 in the gravity direction protrudes from the cylindrical body 88, and a hole 92a is provided in the protruding portion of the flange 92. A fixing bolt 94 is inserted into the hole 92a. The bolt 94 is inserted into the hole 92a of the housing 74, and screwed with a screw hole 64b formed in the case 64 of the gas liquid separator 60 to fix the valve 70 to the gas liquid separator 60.

The channel 72 of the valve 70 (fixing housing 82) includes an inflow channel 96 extending straight in the axial direction of the cylindrical body 88, a valve chamber 98 connected to the inflow channel 96 and accommodating the valve body 80, and an outflow channel 100 connected to the valve chamber 98 and extending in a direction which is different from the direction in which the inflow channel 96 extends. In the embodiment of the present invention, the outflow channel 100 is inclined from the valve chamber 98 toward the lower side in the gravity direction.

Further, the valve 70 includes an orifice 96a at a position shifted slightly away from the valve chamber 98 toward the upstream side, on the inflow channel 96. For example, the orifice 96a is present at a position where the channel cross sectional area (diameter) in the channel 72 is the smallest. For example, the orifice 96a may be provided by installing a ring member 97 forming a small diameter hole in the inflow channel 96 of the fixing housing 82.

The solenoid housing 84 contacts the proximal end surface of the fixing housing 82, and is formed in a cylindrical shape covering an area around the plunger housing 86. The solenoid 76 formed in a cylindrical shape is embedded inside the solenoid housing 84. The coil of the solenoid 76 is electrically connected to terminals 102a of a solenoid connector 102 arranged side by side other on a lateral side of the solenoid housing 84. The solenoid connector 102 is formed in a cylindrical shape protruding outward in a radial direction from an outer circumferential surface of the solenoid housing 84, and a power supply plug (not shown) is inserted into the solenoid connector 102. The solenoid 76 generates a magnetic force based on supply of electrical energy from the outside to move the plunger 78 back and forth.

The plunger housing 86 has a cylindrical shape, and is inserted into the fixing housing 82 and the solenoid housing 84. The proximal end of the plunger housing 86 is closed by a closing frame 104, and fixedly positioned.

A storage space 86a is formed inside, and adjacent to the front end of the plunger housing 86. The storage space 86a is configured to store the plunger 78 in a manner that the plunger 78 is slidable. The storage space 86a is opened at the front end of the plunger housing 86, and exposes a head 108 of the plunger 78. An inner projection member 106 is incorporated at the front end of the plunger housing 86. The inner projection member 106 and the fixing housing 82 cooperatively hold the valve body 80, and define movement limitation of the plunger 78.

The plunger 78 has a columnar shape having the head 108 and a body 110 extending in the axial core direction, and an open/close section 118 of the valve body 80 is joined to the head 108. The plunger 78 moves back and forth in the storage space 86a based on the magnetic force of the solenoid 76, and displaces the open/close section 118 in the axial direction. Further, at the proximal end of the plunger 78 (body 110), a stopper 112 for adjusting the displacement amount of the backward movement the plunger 78, and a spring 114 which applies a biasing force to the plunger 78 in the front end direction are provided.

An elastic member such as a rubber is applicable to the valve body 80. The valve body 80 is disposed movably in the valve chamber 98. As a result of movement of the valve body 80, the valve body 80 opens/closes a border part (ring shaped protrusion 82a of the fixing housing 82) between the inflow channel 96 and the valve chamber 98. The valve body 80 includes a thin section 116 on the outer circumferential side fixed to the housing 74, and a thick open/close section 118 which switches between blocking and opening of the channel 72.

For example, in the state where energization of the solenoid 76 is stopped, the valve body 80 blocks the channel 72 such that the open/close section 118 is brought into contact with the protrusion 82a of the valve chamber 98. On the other hand, in the state where the solenoid 76 is energized, the plunger 78 is displaced in the proximal end direction such that the plunger 78 is spaced from the protrusion 82a of the valve chamber 98, and the valve body 80 opens the channel 72. That is, the valve body 80 is a normally closed type which closes the channel 72 when operation of the fuel cell system 10 is stopped. It should be noted that the valve body 80 may be a normally open type which opens the channel 72 when operation of the fuel cell system 10 is stopped.

In this regard, in the fuel cell system 10, under a low temperature environment, the water which flows through the channel 72 may be frozen. In particular, the orifice 96a provided on the channel 72 tends to close the channel 72 under the low temperature environment. Therefore, the valve 70 according to the embodiment of the present invention includes two (a pair of) heaters 120 for heating the area around (adjacent to) the orifice 96a.

The pair of heaters 120 are in the form of rods, and inclined from the solenoid 76 of the valve 70 in the axial direction of the housing 74, and front ends (heat emitting portions) 122a are provided close to the orifice 96a. Further, the heaters 120 are arranged in the width direction on the upper side of the housing 74 in the gravity direction, and extend outside the valve chamber 98 at a position spaced from the outflow channel 100. Then, extensions of the axial cores of the heaters 120 intersect with each other at the center of the orifice 96a.

A pair of installation holes 83 for installing the heaters 120 are formed in the housing 74 (fixing housing 82). The installation holes 83 are connected to insertion ports 83a in the proximal end surface of the fixing housing 82. Therefore, it is possible to form each of the installation holes 83 in the housing 74 easily. At the time of assembling the valve 70, the heaters 120 are inserted from the insertion ports 83a in the front end direction of the installation holes 83, and the front ends 122a of the heaters 120 are positioned close to the orifice 96a.

Each of the heaters 120 is a cartridge type including an elongated bar 122, a coupling member 124 attached to a proximal end of the bar 122, a harness 126 inserted from a proximal end of the coupling member 124 and electrically coupled to the bar 122.

The bar 122 includes the front end 122a positioned close to the above orifice 96a (ring member 97) which is a small diameter hole. The phrase "close to" in the sentence: "The front end 122a is positioned close to the orifice 96a" means that the front end 122a is positioned at least inside of the extension part of the heater 120 (bar 122) in the radial direction, and the front end 122a is not exposed to the channel 72.

Further, preferably, the inclination angle θ defined by the axial line of the bar 122 and the axial direction of the housing 74 is not more than 45°. Therefore, the bar 122 is not significantly remote from the housing 74 in the axial direction, and reduction in the diameter of the housing 74 is facilitated. Further, it is adequate that the minimum distance Di between the inner point closest to the orifice 96a in the front end 122a and the inner surface of the orifice 96a is determined in the range of, e.g., 1 mm to several cm, or, in the range of 0.5 to 3 times the diameter φo of the orifice 96a, depending on the size of the valve 70.

On the other hand, the proximal end of the bar 122 is inclined from the proximal end surface of the fixing housing 82, and protrudes in the proximal end direction of the fixing housing 82. Further, the heater 120 according to the embodiment of the present invention is configured such that the front end 122a of the bar 122 is heated and heating of the extension part on the proximal end side of the front end 122a is suppressed. It should be noted that the heater 120 may be configured to be heated uniformly over the entire length of the bar 122.

The coupling member 124 of the heater 120 has a cylindrical shape having a bottom including a hollow part 124a inside the coupling member 124. The proximal end side of the bar 122 is inserted into the coupling member 124 to cover the connecting part between the harness 126 and the bar part 122. A through hole 124b into which the harness 126 passes through is formed at the center of the bottom of the coupling member 124. The coupling member 124 and the bar 122 are firmly fixed by suitable means such as welding, adhesion, and screwing.

Further, the housing 74 and the coupling member 124 form an attachment mechanism 128 for attaching the heater 120. For example, the attachment mechanism 128 includes a female screw part (not shown) formed on an inner surface of the fixing housing 82 forming the installation hole 83, and a male screw part (not shown) formed on an outer circumferential surface of the coupling member 124 which can be screwed with the female screw part. It should be noted that the attachment mechanism 128 may be provided by other means such as welding, adhesion, etc.

In the coupling member 124, the portion protruding from the proximal end of the fixing housing 82 (proximal end part of the heater 120) is spaced from the case 64 (non-contact with the case 64).

One end of the harness 126 is connected to the bar 122, and the other end of the harness 126 is connected to a power distribution part (or the control device 20). The harness 126 heats the bar 122 using electrical energy supplied from the power distribution part under control of the control device 20. Each of the heaters 120 is configured to perform heating under power supply of, e.g., about 50 W.

Referring back to FIG. 1, the control device 20 of the fuel cell system 10 is made up of a computer including a processor, a memory, and an input/output interface, and controls operation of the anode system apparatus 14 including the valve 70, the cathode system apparatus 16, and the cooling apparatus 18. Further, a temperature sensor 62 provided for the anode discharge pipe 50, a temperature sensor 130 provided at a suitable position of the vehicle 11, and a pressure sensor 59 provided for the anode supply pipe 48, etc. are connected to the control device 20 in a manner that these components can communicate with the control device 20. The control device 20 continues its operation even during stop of operation of the vehicle 11, monitors the state of the valve 70 based on detection signals of the temperature sensors 62, 130, and the pressure sensor 59, and controls operation of the pair of heaters 120.

The valve 70 according to the embodiment of the present invention basically has the above structure. Hereinafter, operation of the valve 70 will be described below.

In the fuel cell system 10, under the control of the control device 20, the anode gas is supplied from the anode supply pipe 48 of the anode system apparatus 14 to the fuel cell stack 12, and the cathode gas is supplied from the cathode supply pipe 40 of the cathode system apparatus 16 to the fuel cell stack 12. Therefore, in the fuel cell stack 12, the anode gas is supplied to the anode 30 of each of the power generation cells 22, and the cathode gas is supplied to the cathode 32 of each of the power generation cells 22 to perform power generation in each of the power generation cells 22. Further, during power generation of the fuel cell stack 12, the control device 20 operates the cooling apparatus 18 to circulate the coolant to cool the fuel cell stack 12.

During power generation of the fuel cell stack 12, the anode off gas is discharged into the anode discharge pipe 50 of the anode system apparatus 14, and the cathode off gas is discharged into the cathode discharge pipe 42 of the cathode system apparatus 16. The anode off gas discharged into the anode discharge pipe 50 flows through the gas liquid separator 60 on the downstream side, and the anode off gas is separated into hydrogen and water in the gas liquid separator 60. Then, hydrogen in the gas liquid separator 60 flows through the bypass pipe 52 based on sucking of the ejector 58, and the hydrogen is supplied to the anode supply pipe 48.

Further, the control device 20 supplies electrical energy to the solenoid 76 of the valve 70 at suitable timing during power generation, and opens the channel 72 in the valve 70 to discharge reactant gases such as the hydrogen, the water vapor, the nitrogen, etc. together with water of the gas liquid separator 60 into the water discharge pipe 68.

Then, when operation of the fuel cell system 10 is stopped as a result of stop of the vehicle 11 and when operation of the fuel cell system 10 is started, the control device 20 monitors the state of the valve 70. That is, when the area around the fuel cell system 10 is placed under the low temperature environment, the water which flows from the gas liquid separator 60 into the channel 72 of the valve 70 is frozen. In particular, at the position in the channel 72 where the orifice 96a is formed, since the channel 72 is narrow, the channel 72 tends to be closed due to freezing. Therefore, the control device 20 determines occurrence of freezing in the channel 72 of the valve 70 or predicts occurrence of freezing, to heat the valve 70 by the heater 120.

For example, when operation of the fuel cell system 10 is stopped, the control device 20 detects the pressure of the anode gas in the anode supply pipe 48 by the pressure sensor 59, and when the detection pressure of the anode gas becomes not less than a predetermined pressure threshold value, supply of electrical energy to the heater 120 is started. This is because, it is predicted that, in the case where the pressure is not less than the pressure threshold valve, the channel 72 of the valve 70 is closed by freezing.

Alternatively, when the control device 20 determines that the detected temperature becomes not more than a predetermined temperature threshold value (e.g., 0° C.), and elapse of predetermined time in the state where the detected temperature is not more than the temperature threshold value, based on the detected temperature of the temperature sensor 62 (or the temperature sensor 130) and the time measurement, the control device 20 starts supply of electrical energy to the heater 120. As described above, by monitoring the elapse of predetermined time in the state where the detected temperature is not more than the temperature threshold value, it is possible to predict the occurrence of freezing.

In the case where freezing occurs, or occurrence of freezing is predicted, the control device 20 heats the valve 70 by supplying electrical energy to the pair of heaters 120 of the valve 70. As shown in FIG. 3, the front end 122a of each of the heaters 120 is positioned close to the orifice 96a, and increases the temperature of the housing 74 adjacent to the orifice 96a by heating. Therefore, for example, in the case where the orifice 96a is closed by freezing, it is possible to place the channel 72 in the valve 70 into the state where the liquid can flow, by immediately defrosting the orifice 96a. Further, for example, in the case where the orifice 96a tends to be frozen, by heating the portion around the orifice 96a, it is possible to suppress freezing.

It should be noted that the present invention is not limited to the above described embodiment. Various modifications may be made in line with the gist of the present invention. For example, structure of the heater 120 of the present invention may be applicable to other valves of the anode system apparatus 14, and may be applicable to the valves provided for the cathode system apparatus 16 (reactant gas system apparatus 17).

The manner of installation of the heaters 120 of the valve 70, and the number of the installed heaters 120 of the valve 70 are not limited specially. For example, only one heater 120 may be provided, or three or more heaters 120 may be provided. Further, the heater 120 may be provided on a lateral side opposite to the solenoid connector 102. Alternatively, the heater 120 may be provided on the lower side of the housing 74 (fixing housing 82) in the gravity direction.

Figure 4:
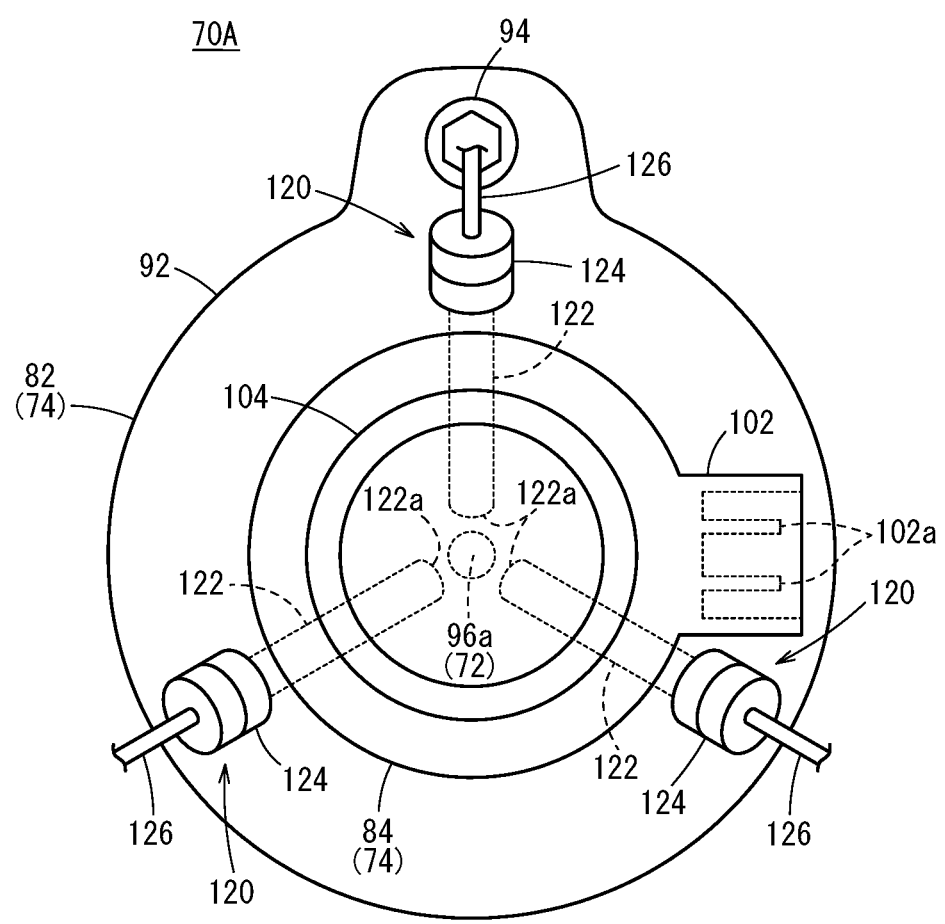
FIG. 4 is a view schematically showing a valve according to a modified embodiment, as viewed from a proximal end side.

Further, for example, as in the case of a modified embodiment shown in FIG. 4, a valve 70A may include a heater 120 on the upper side in the gravity direction, and a heater 120 on the lower side, and a valve body 80 may be sandwiched between the heater 120 on the upper side in the gravity direction and the heater 120 on the lower side in the gravity direction. In FIG. 4, one heater 120 is provided on the upper side in the gravity direction, and a pair of (two) heaters 120 are provided on the lower side in the gravity direction. Each of the heaters 120 provided in this manner can heat the orifice 96a substantially equally in the circumferential direction, and expedite defrosting of the orifice 96a.

The technical concepts and advantages understood from the above embodiments will be described below.

The valve 70, 70A disposed in the reactant gas system apparatus 17 of the fuel cell system 10, the valve 70, 70A including the housing 74 having the internal channel 72 where liquid is configured to flow, and the heater 120 in the form of a rod inserted into the housing 74, wherein the orifice 96a having a small channel cross sectional area is provided at a predetermined position of the channel 72, and the heater 120 is inclined from the solenoid 76 of the valve 70, 70A, in an axial direction of the housing 74, and the front end 122a of the heater 120 is positioned close to the orifice 96a.

In the valve 70, 70A, the front end 122a of the heater 120 is provided close to the orifice 96a. In the structure, under the low temperature environment, it is possible to rapidly heat the area around the orifice 96a by the heater 120, and suppress freezing of the orifice 96a, or defrost the orifice 96a suitably. Further, since the heater 120 is inclined from the solenoid 76 in the axial direction of the housing 74, it is possible to install the heater 120 without requiring the housing 74 to become thick, away from the channel 72. Therefore, it is possible to reduce the size of the valve 70, 70A, and it becomes possible to dispose the valve 70, 70A in the fuel cell system 10 installed in a small space, and improve the degree of freedom in the channel shape.

Further, the channel 72 includes the inflow channel 96 having the orifice 96a, and extending in parallel to the axial direction, the valve chamber 98 connected to the inflow channel 96, and opened/closed by the valve body 80, and the outflow channel 100 extending from the valve chamber 98 in the direction different from the direction in which the inflow channel 96 extends, wherein the heater 120 extends away from the outflow channel 100, outside the valve chamber 98. In the structure, the valve 70, 70A can reliably place the channel 72 into the state where the liquid can flow, and allows the heater 120 to extend up to the orifice 96a.

Further, the valve 70, 70A is fixed to a structural body (case 64) where the liquid flows in the channel 72, and the proximal end of the heater 120 is exposed at a position spaced from the structural body. In this manner, it is possible to suppress interference of the structural body with the heater 120, and supply electrical energy to the heater 120.

Further, the plurality of heaters 120 are provided for the housing 74. In the structure, in the valve 70, 70A, it is possible to heat the area around the orifice 96a in a much shorter period of time.

Further, the number of heaters 120 disposed on the lower side of the housing 74 in the gravity direction is larger than the number of heaters 120 disposed on the upper side of the housing 74 in the gravity direction. That is, basically, the valve 70A is provided on the lower side of the structural body (case 64) in the gravity direction. Therefore, the large number of the heaters 120 provided on the lower side in the gravity direction can easily avoid interference with the structural body, and can extend up to the orifice 96a.

Further, the inclination angle θ defined by the axial line of the heater 120 and the axial direction of the housing 74 is not more than 45°. In the structure, since the heater 120 is installed in line with the axial direction of the housing 74, it is possible to reduce the size of the valve 70, 70A to a greater extent.

Further, the valve 70, 70A is the purge valve configured to discharge water produced in the reactant gas system apparatus 17. In the structure, when water in the reactant gas system apparatus 17 flows into the channel 72 of the valve 70, 70A, it is possible to suppress freezing of the orifice 96a or defrost the orifice 96a by the heat applied from the heater 120.

What is claimed is:

1. A valve disposed in a reactant gas system apparatus of a fuel cell system,
the valve comprising:
a housing having an internal channel where liquid is configured to flow; and
a heater in the form of a rod inserted into the housing,
wherein an orifice having a small channel cross sectional area is provided at a predetermined position of the channel, and
the heater is inclined from a solenoid of the valve in an axial direction of the housing, and a front end of the heater is positioned close to the orifice.

2. The valve according to claim 1, wherein the channel comprises:
an inflow channel having the orifice, and extending in parallel to the axial direction;
a valve chamber connected to the inflow channel, and opened/closed by a valve body; and
an outflow channel extending from the valve chamber in a direction different from a direction in which the inflow channel extends,
wherein the heater extends away from the outflow channel, outside the valve chamber.

3. The valve according to claim 1, wherein the valve is fixed to a structural body where the liquid flows in the channel; and
a proximal end of the heater is exposed at a position spaced from the structural body.

4. The valve according to claim 1, wherein the heater comprises a plurality of heaters provided for the housing.

5. The valve according to claim 4, wherein number of heaters disposed on a lower side of the housing in a gravity direction is larger than number of heaters disposed on an upper side of the housing in the gravity direction.

6. The valve according to claim 1, wherein the inclination angle defined by an axial line of the heater and an axial direction of the housing is not more than 45°.

7. The valve according to claim 1, wherein the valve comprises a purge valve configured to discharge water produced in the reactant gas system apparatus.

* * * * *